United States Patent Office 3,349,091
Patented Oct. 24, 1967

3,349,091
1-AMINOALKYL-5-[(HALO/ALKOXY)PHENYL]-2-PYRROLEPROPIONIC ACIDS
Leland J. Chinn, Morton Grove, Ill., assignor to G. D. Searle & Co., Chicago, Ill., a corporation of Delaware
No Drawing. Filed Dec. 29, 1966, Ser. No. 605,544
11 Claims. (Cl. 260—268)

ABSTRACT OF THE DISCLOSURE

Disclosed herein are anti-inflammatory, pepsin-inhibiting, and anti-biotic 1-[(cyclic amino)alkyl]-5-[(halo/alkoxy)phenyl]-2-pyrrolepropionic acids and processes of preparing them via halo/alkoxy-3-(2-furyl)-acrylophenones and/or 7-[(halo/alkoxy)phenyl]-4,7-dioxoheptanoic acids.

---

This invention provides new, useful, and unobvious chemical compounds of the formula

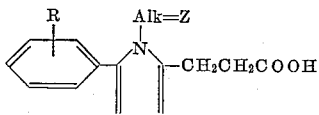

wherein R represents either halogen or an alkoxy radical, Alk represents an alkylene radical, and Z represents a cyclic amino radical.

Among the halogens comprehended by R, fluorine, chlorine, and bromine, are especially preferred, while the alkoxy radicals comprehended thereby are most desirably methoxy, ethoxy, propoxy, isopropoxy, butoxy, isobutoxy, pentyloxy, neopentyloxy (i.e., 2,2-dimethylpropoxy), hexyloxy, isohexyloxy, heptyloxy, and like monovalent, saturated, acyclic, straight- or branched-chain groupings of empirical formula

wherein $x$ represents a positive integer less than 8 and which are hereinafter termed lower alkoxy radicals. The positioning of the phenyl substituents represented by R with respect to attachment of the phenyl nucleus to the pyrrole ring is not critical, ortho, meta, and para isomers alike being adapted to the purposes of this invention.

The alkylene radicals represented by Alk are advantageously lower alkylene groupings such as methylene, ethylene, trimethylene, propylene, tetramethylene, 2-methyl-1,2-propylene, pentamethylene, 2,2-dimethyl-1,3-propylene, and such bivalent, saturated, acylic, straight- or branched-chain, hydrocarbon groupings having the formula

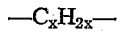

wherein $x$ is defined as before. Among these lower alkylene groupings, some containing fewer than 3 or 4 carbon atoms are particularly preferred.

The cyclic amino radicals represented by Z are pyrrolidinyl, piperidyl, piperazinyl, or morpholinyl groupings attached to the pyrrole ring either through nitrogen or any of the carbons in the groupings. A terminal "ino" in the radical name set forth denotes attachment via nitrogen. When attachment is via carbon, the nitrogen in each instance can be substituted by an alkyl grouping which, like the alkoxy and alkylene groupings aforesaid, is preferably of lower order. Typical lower alkyl groupings are methyl, ethyl, propyl, isopropyl, butyl, isobutyl, sec-butyl, tert-butyl, pentyl, neopentyl, hexyl, isohexyl, heptyl, and homologous and/or isomeric, monovalent, saturated, acyclic, straight-or branched-chain, hydrocarbon groupings of empirical formula

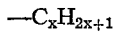

wherein $x$ is defined as before.

The compounds of this invention are useful because of their valuable pharmacological properties. Thus, for example, they counteract the edema which characterizes exogenously-induced inflammation, they inhibit the proteolysis of hemoglobin by pepsin, and they are antibiotics in respect of bacteria such as *Diplococcus pneumoniae*, protozoa such as *Tetrahymena gelleii*, fungi such as *Trichophyton mentagrophytes*, algae such as *Chlorella vulgaris*, and dicotyledenous seed germination.

Preparation of the subject compounds proceeds by heating a 7 - [(halo/alkoxy)phenyl]-4,7-dioxoheptanoic acid

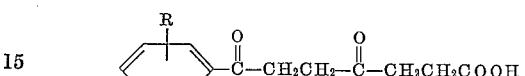

(wherein R is defined as before) with an aminoalkylamine of the formula $$Z\text{-Alk-}NH_2$$

(wherein Alk and Z are defined as before) in the presence of a dehydrating agent such as p-toluenesulfonic acid, using an inert, organic solvent such as toluene as the reaction medium. The heptanoic acid intermediates can be prepared by condensing a nuclearly-substituted acetophenone

with 2-furaldehyde at room temperature in a methanol solution containing sodium methoxide as the condensing agent. From the resultant 3-(2-furyl)acrylophenone

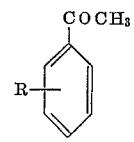

the corresponding heptanoic acid intermediate is obtained on heating with hydrochloric acid. (R in the latter two formulas retains the meaning previously assigned.)

The following examples describe in detail compounds illustrative of the present invention and methods which have been devised for their preparation. However, the invention is not to be construed as limiting thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *2'-fluoro-3-(2-furyl)acrylophenone.*—To a solution of 112 parts of o-fluoroacetophenone and 96 parts of 2-furaldehyde in 96 parts of methanol is added a solution of 15 parts of sodium methoxide and 200 parts of methanol. The resultant mixture is allowed to stand at room temperature for 16 hours, whereupon insoluble solids are filtered off, washed with aqueous 50% methanol, and dried in air. The product thus isolated is 2'-fluoro-3-(2-furyl)acrylophenone.

B. *7 - (o-fluorophenyl) - 4,7-dioxoheptanoic acid.*—A mixture of 60 parts of 2'-fluoro-3-(2-furyl)acrylophenone, 180 parts of concentrated hydrochloric acid, and 480 parts of absolute ethanol is heated at the boiling point under reflux for 16 hours, then distilled nearly to dryness in vacuo. To the residue is added 300 parts of glacial acetic acid, 360 parts of concentrated hydrochloric acid, and 600 parts of water. The resultant mixture is heated at the boiling point under reflux for 3 hours, then cooled to room temperature, at which point the supernatant solution is decanted from a black tar and chilled to 0°. The precipitate which forms is filtered off, washed with water, and dried in air. The product thus isolated is 7-(o-fluorophenyl)-4,7-dioxoheptanoic acid.

C. 5 - (o-fluorophenyl) - 1 - [2 - (1-ethyl-2-pyrrolidinyl)ethyl]-2-pyrrolepropionic acid.—A mixture of 400 parts of 7-(o-fluorophenyl)-4,7-dioxoheptanoic acid, 240 parts of 2-(2-aminoethyl)-1-ethylpyrrolidine, 3 parts of p-toluenesulfonic acid monohydrate, and 18,000 parts of toluene is heated at the boiling point under reflux for 15 hours, water being removed as formed. The resultant mixture is distilled nearly to dryness at atmospheric pressure. The residue is washed by trituration with a mixture of ether and hexane. Insoluble solids are filtered off and dried in air. The product thus isolate is 5-(o-fluorophenyl) - 1 - [2 - (1 - ethyl-2-pyrrolidinyl)ethyl]-2-pyrrolepropionic acid, having the formula

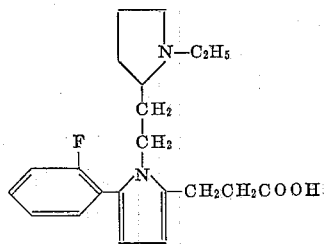

EXAMPLE 2

A. 4' - chloro-3-(2-furyl)acrylophenone.—Substitution of 12 parts of p-chloroacetophenone for the o-fluoroacetophenone called for in Example 1A affords, by the procedure there detailed, 4'-chloro-3-(2-furyl)-acrylophenone.

B. 7 - (p-chlorophenyl) - 4,7-dioxoheptanoic acid.—Substitution of 33 parts of 4'-chloro-3-(2-furyl)acrylophenone for the 2'-fluoro-3-(2-furyl)acrylophenone called for in Example 1B affords, by the procedure there detailed, 7-(p-chlorophenyl)-4,7-dioxoheptanoic acid.

C. 5 - (p-chlorophenyl) - 1-(3-pyrrolidinylmethyl)-2-pyrrolepropionic acid.—Substitution of 400 parts of 7-(p-chlorophenyl)-4,7-dioxoheptanoic acid and 240 parts of 3-(aminomethyl)pyrrolidine for the 7-(o-fluorophenyl) - 4,7 - dioxoheptanoic acid and 2-(2-aminoethyl)-1-ethylpyrrolidine, respectively, called for in Example 1C affords, by the procedure there detailed, 5-(p-chlorophenyl) - 1 - (3-pyrrolidinylmethyl)-2-pyrrolepropionic acid, having the formula

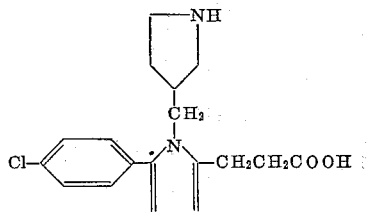

EXAMPLE 3

5 - (p-chlorophenyl) - 1 - (1-methyl-3-pyrrolidinylmethyl)-2-pyrrolepropionic acid.—A mixture of 400 parts of 7-(p-chlorophenyl)-4,7-dioxoheptanoic acid, 240 parts of 3-aminomethyl-1-methylpyrrolidine, 3 parts of p-toluenesulfonic acid monohydrate, and 18,000 parts of toluene is heated at the boiling point under reflux for 3 hours, water being removed as formed. The resultant mixture is distilled nearly to dryness at atmospheric pressure, and the residue is washed by successively triturating with hexane and ether. The insoluble product, filtered off, dried in air, and recrystallized from a mixture of ethyl acetate and hexane, affords 5-(p-chlorophenyl)-1-(1-methyl - 3 - pyrrolidinylmethyl)-2-pyrrolepropionic acid melting at 107–111.5°. The product has the formula

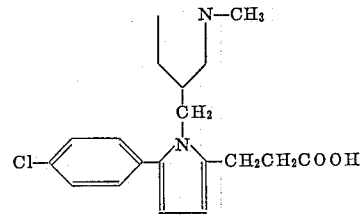

EXAMPLE 4

A. 3' - bromophenyl-3-(2-furyl)acrylophenone.—Substitution of 112 parts of m-bromoacetophenone for the o-fluoroacetophenone called for in Example 1A affords, by the procedure there detailed, 3'-bromophenyl-3-(2-furyl)-acrylophenone.

B. 7 - (m-bromophenyl) - 4,7 - dioxoheptanoic acid.—Substitution of 33 parts of 3'-bromo-3-(2-furyl)acrylophenone for the 2'-fluoro-3-(2-furyl)acrylophenone called for in Example 1B affords, by the procedure there detailed, 7-(m-bromophenyl)-4,7-dioxoheptanoic acid.

C. 5 - (m-bromophenyl) - 1-(3-pyrrolidinopropyl)-2-pyrrolepropionic acid.—Substitution of 400 parts of 7-(m-bromophenyl)-4,7-dioxoheptanoic acid and 240 parts of 1-(3-aminopropyl)pyrrolidine for the 7-(o-fluorophenyl)-4,7-dioxoheptanoic acid and 2-(2-aminoethyl)-1-ethylpyrrolidine, respectively, called for in Example 1C affords, by the procedure there detailed, 5-(m-bromophenyl) - 1 - (3-pyrrolidinopropyl)-2-pyrrolepropionic acid, having the formula

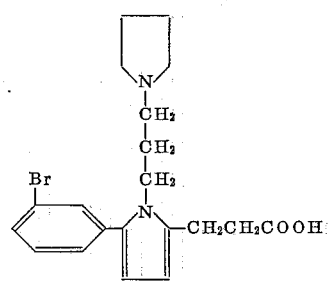

EXAMPLE 5

5-(p-methoxyphenyl)-1-(1 - methyl - 3 - pyrrolidinylmethyl)-2-pyrrolepropionic acid.—A mixture of 400 parts of 7-(p-methoxyphenyl)-4,7 - dioxoheptanoic acid, 240 parts of 3-aminomethyl-1-methylpyrrolidine, 3 parts of p-toluenesulfonic acid monohydrate, and 18,000 parts of toluene is heated at the boiling point under reflux for 15 hours, water being removed as formed. The resultant mixture is distilled nearly to dryness at atmospheric pressure. The residue, upon trituration with hexane, affords a gum. The gum is crystallized from a mixture of ethyl acetate and ether to give 5-(p-methoxyphenyl)-1-(1-methyl-3-pyrrolidinylmethyl)-2 - pyrrolepropionic acid melting at 111.5–116.5°. The product has the formula

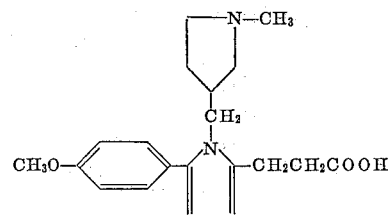

EXAMPLE 6

A. 3′-fluoro-3-(2-furyl)acrylophenone.—Substitution of 112 parts of m-fluoroacetophenone for the o-fluoroacetophenone called for in Example 1A affords, by the procedure there detailed, 3′-fluoro-3-(2-furyl)-acrylophenone.

B. 7-(m-fluorophenyl)-4,7-dioxoheptanoic acid.—Substitution of 60 parts of 7-(m-fluorophenyl)-4,7-dioxoheptanoic acid for the 7-(o-fluorophenyl)-4,7-dioxoheptanoic acid called for in Example 1B affords, by the procedure there detailed, 7-(m-fluorophenyl)-4,7-dioxoheptanoic acid.

C. 5-(m-fluorophenyl)-1-(2-piperidylmethyl)-2-pyrrolepropionic acid.—Substitution of 400 parts of 5-(m-fluorophenyl)-1-(2-piperidylmethyl)-2-pyrrolepropionic acid and 240 parts of 2-(aminomethyl)piperidine for the 7-(o-fluorophenyl)-4,7-dioxoheptanoic acid and 2-(2-aminoethyl)-1-ethylpyrrolidine, respectively, called for in Example 1C affords, by the procedure there detailed, 5-(m-fluorophenyl)-1-(2-piperidylmethyl)-2-pyrrolepropionic acid, having the formula

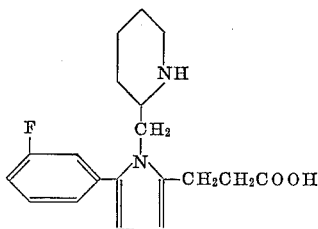

EXAMPLE 7

5-(p-chlorophenyl)-1-(3-piperidinopropyl)-2-pyrrolepropionic acid.—A mixture of 400 parts of 7-(p-chlorophenyl)-4,7-dioxoheptanoic acid, 240 parts of 1-(3-aminopropyl)piperidine, 3 parts of p-toluenesulfonic acid monohydrate, and 18,000 parts of toluene is heated at the boiling point under reflux for 3 hours, water being removed as formed. The resultant mixture is distilled nearly to dryness at atomspheric pressure, whereupon the residue is triturated with hexane. Insoluble solids are filtered off and crystallized from a mixture of ethyl acetate and hexane to give 5-(p-chlorophenyl)-1-(3-piperidinopropyl)-2-pyrrolepropionic acid melting at 131–136°. The product has the formula

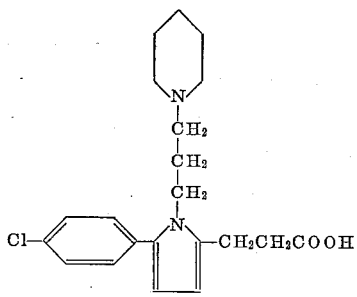

EXAMPLE 8

A. 2′-bromo-3-(2-furyl)acrylophenone.—Substitution of 112 parts of o-bromoacetophenone for the o-fluoroacetophenone called for in Example 1A affords, by the procedure there detailed, 2′-bromo-3-(2-furyl)-acrylophenone.

B. 7-(o-bromophenyl)-4,7-dioxoheptanoic acid.—Substitution of 33 parts of 2′-bromo-3-(2-furyl)acrylophenone for the 2′-fluoro-3-(2-furyl)acrylophenone called for in Example 1B affords, by the procedure there detailed, 7-(o-bromophenyl)-4,7-dioxoheptanoic acid.

C. 5-(o-bromophenyl)-1-[3(4-piperidyl)propyl]-2-pyrrolepropionic acid.—Substitution of 400 parts of 7-(o-bromophenyl)-4,7-dioxoheptanoic acid and 240 parts of 4-(2-aminoethyl)piperidine for the 7-(o-fluorophenyl)-4,7-dioxoheptanoic acid and 2-(2-aminoethyl)-1-ethylpyrrolidine, respectively, called for in Example 1C affords, by the procedure there detailed, 5-(-bromophenyl)-1-[3-(4-piperidyl)propyl]-2-pyrrolepropionic acid, having the formula

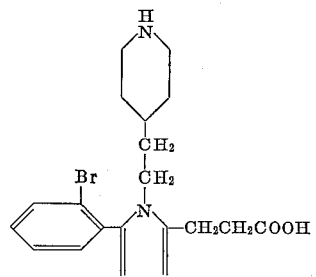

EXAMPLE 9

5-(m-ethoxyphenyl)-1-(3-piperidinopropyl)-2-pyrrolepropionic acid.—Substitution of 400 parts of 7-(m-ethoxyphenyl)-4,7-dioxoheptanoic acid and 240 parts of 1-(3-aminopropyl)piperidine for the 7-(p-methoxyphenyl)-4,7-dioxoheptanoic acid and 3-aminomethyl-1-methylpyrrolidine, respectively, called for in Example 5 affords, by the procedure there detailed, 5-(m-ethoxyphenyl)-1-(3-piperidinopropyl)-2-pyrrolepropionic acid melting at 61–63°. The product has the formula

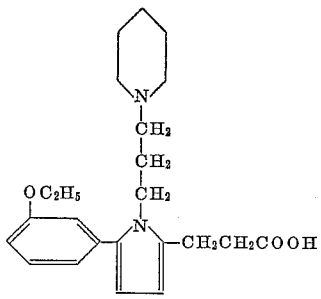

EXAMPLE 10

5-(p-fluorophenyl)-1-(2-piperazinoethyl)-2-pyrrolepropionic acid.—A mixture of 400 parts of 7-(p-fluorophenyl)-4,7,-dioxoheptanoic acid, 240 parts of 1-(2-aminoethyl)piperazine, 3 parts of p-toluenesulfonic acid monohydrate, and 18,000 parts of toluene is heated at the boiling point under reflux for 15 hours, water being removed as formed. The resultant mixture is concentrated by distillation at atmospheric pressure to approximately one-fifth its original volume. The concentrate is washed by trituration with ether, whereupon insoluble solids are filtered off, washed successively with water, ethyl acetate, and ether, and dried in air to give 5-(p-fluorophenyl)-1-(2-piperazinoethyl)-2-pyrrolepropionic acid melting at 216–220°. The product has the formula

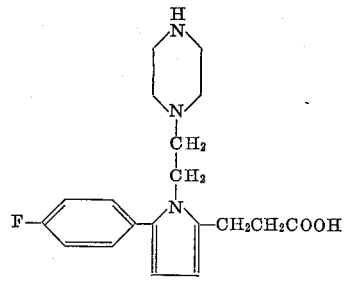

EXAMPLE 11

5-(p-fluorophenyl)-1-(2-piperazinoethyl)-2-pyrrolepropionic acid.—A mixture of 400 parts of 7-(p-chlorophenyl)-4,7-dioxohepanoic acid, 240 parts of 1-(2-aminoethyl)piperazine, 3 parts of p-toluenesulfonic acid monohydrate, and 18,000 parts of toluene is heated at the boiling point under reflux for 3 hours, water being removed as formed. The resultant mixture is chilled. Insoluble solids thrown down are filtered off, washed successively with water, ethyl acetate, and ether, and dried in air to give 5-(p-chlorophenyl)-1-(2-piperazinoethyl)-2-pyrrolepropionic acid melting at 223–229°, with decomposition. The product has the formula

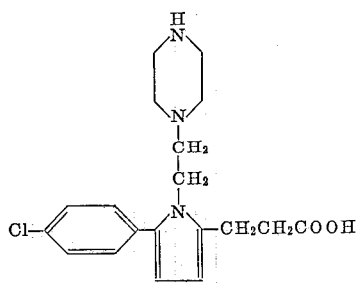

EXAMPLE 12

A. *2-methylaminopiperazine.*—A mixture of 40 parts of 2-piperazinecarboxamide, 30 parts of lithium aluminum hydride, and 900 parts of tetrahydrofuran is stirred and heated at the boiling point under reflux for 15 hours, whereupon it is decomposed by the introduction of an excess of water. Insoluble solids are filtered off and washed with hot isopropyl alcohol. Filtrate and washings are combined and freed of solvent by vaccum distillation. The residue is extracted with ether. The ether extract is washed with water, dried over anhydrous sodium sulfate, and stripped of solvent by vacuum distillation to afford 2-methylaminopiperazine as the residue.

B. *5-(m-bromophenyl) - 1 - (2-piperazinylmethyl)-2-pyrrolepropionic acid.*—Substitution of 400 parts of 7-(m-bromophenyl)-4,7-dioxoheptanoic acid and 240 parts of 2-(aminoethyl)piperazine for the 7-(o-fluorophenyl) 4,7-dioxoheptanoic acid and 2-(2-aminoethyl)-1-ethylpyrrolidine, respectively, called for in Example 1C affords, by the procedure there detailed 5-(m-bromophenyl)-1-(2-piperazinylmethyl)-2-pyrrolepropionic acid, having the formula

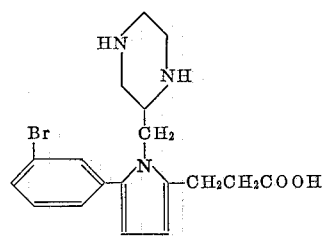

EXAMPLE 13

*5-(m - ethoxyphenyl) - 1 - (2-piperazinoethyl)-2-pyrrolepropionic acid.*—A mixture of 400 parts of 7-(m-ethoxyphenyl)-4,7-dioxoheptanoic acid, 240 parts of 1-(3-aminopropyl)piperazine, 3 parts of p-toluenesulfonic acid monohydrate, and 18,000 parts of toluene is heated at the boiling point under reflux for 1 hour, then concentrated to approximately one-fifth of its original volume by distillation at atmospheric pressure. Insoluble solids thrown down are filtered off, washed successively with water, ethyl acetate, and boiling ethanol, then dried in air to give 5-(m-ethoxyphenyl)-1-(2-piperazinoethyl)-2-pyrrolepropionic acid melting at 187.5–190.5°, with decomposition. The product has the formula

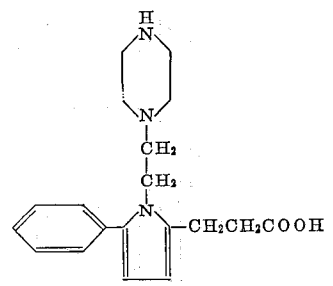

What is claimed is:
1. A compound of the formula

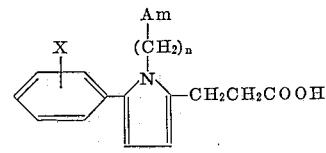

wherein X represents halogen of atomic number less than 53 or lower alkoxy; Am represents pyrrolidinyl, N-(lower alkyl)pyrrolidinyl, piperidyl, N-(lower alkyl)piperidyl, piperazinyl, N-(lower alkyl)piperazinyl, or N,N'-bis-(lower alkyl)piperazinyl; and $n$ represents a positive integer less than 4.

2. A compound according to claim 1 wherein X represents halogen of atomic number less than 35, Am represents pyrrolidinyl, and $n$ represents a positive integer less than 4.

3. A compound according to claim 1 wherein X represents halogen of atomic number less than 35, Am represents N-(lower alkyl)pyrrolidinyl, and $n$ represents a positive integer less than 3.

4. A compound according to claim 1 which is 5-(p-chlorophenyl) - 1 - (1 - methyl - 3 - pyrrolidinyl methyl)-2-pyrrolepropionic acid.

5. A compound according to claim 1 which is 5-(p-methoxyphenyl) - 1 - (1 - methyl - 3 - pyrrolidinylmethyl)-2-pyrrolepropionic acid.

6. A compound according to claim 1 wherein X represents halogen of atomic number less than 53, Am represents piperidyl, and $n$ represents a positive integer less than 4.

7. A compound according to claim 1 which is 5-(p-chlorophenyl) - 1 - (3 - piperidinopropyl) - 2 - pyrrolepropionic acid.

8. A compound according to claim 1 which is 5-(m-ethoxyphenyl) - 1 - (3 - piperidinopropyl) - 2 - pyrrolepropionic acid.

9. A compound according to claim 1 wherein X represents halogen of atomic number less than 53, Am represents piperazinyl, and $n$ represents a positive integer less than 3.

10. A compound according to claim 1 which is 5-(p-chlorophenyl) - 1 - (2 - piperazinoethyl) - 2 - pyrrolepropionic acid.

11. A compound according to claim 1 which is 5-(m-ethoxyphenyl) - 1 - (2 - piperazinoethyl) - 2 - pyrrolepropionic acid.

No references cited.

HENRY R. JILES, *Primary Examiner.*